United States Patent
Ohbitsu (10) Patent No.: US 8,666,229 B2
(45) Date of Patent: Mar. 4, 2014

(54) FAVORITE PROGRAM EXTRACTING DEVICE AND METHOD

(75) Inventor: Toshiro Ohbitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 997 days.

(21) Appl. No.: 12/458,858

(22) Filed: Jul. 24, 2009

(65) Prior Publication Data
US 2009/0285549 A1    Nov. 19, 2009

Related U.S. Application Data

(63) Continuation of application No. PCT/JP2007/051129, filed on Jan. 25, 2007.

(51) Int. Cl.
*H04N 5/76*    (2006.01)
*H04N 9/80*    (2006.01)

(52) U.S. Cl.
USPC ........... 386/291; 386/239; 386/248; 386/296; 386/297

(58) Field of Classification Search
USPC ................................ 386/239–262, 291–299
See application file for complete search history.

(56) References Cited

U.S. PATENT DOCUMENTS

| | | | |
|---|---|---|---|
| 6,577,805 B1 * | 6/2003 | Hirai | 386/241 |
| 7,277,894 B2 | 10/2007 | Kondo et al. | |
| 2002/0174430 A1 * | 11/2002 | Ellis et al. | 725/46 |
| 2003/0135539 A1 | 7/2003 | Kondo et al. | |
| 2004/0107207 A1 | 6/2004 | Kondo et al. | |
| 2005/0163481 A1 * | 7/2005 | Hirai | 386/69 |
| 2007/0078715 A1 * | 4/2007 | Murakami | 705/14 |
| 2007/0122121 A1 * | 5/2007 | Tanabe | 386/107 |
| 2007/0174862 A1 * | 7/2007 | Kushida et al. | 725/15 |
| 2008/0215662 A1 | 9/2008 | Kondo et al. | |

FOREIGN PATENT DOCUMENTS

| | | |
|---|---|---|
| JP | 11-134345 | 5/1999 |
| JP | 2004-56630 | 2/2004 |
| JP | 2005-312023 | 11/2005 |
| JP | 2006-229494 | 8/2006 |
| WO | 02/059785 | 8/2002 |

OTHER PUBLICATIONS

Japanese Notice of Reasons for Rejection mailed Nov. 22, 2011 issued in corresponding Japanese Patent Application No. 2008-554933.
International Preliminary Report on Patentability, mailed Jul. 28, 2009, in corresponding International Application No. PCT/JP2007/051129 (5 pp.).
International Search Report, mailed Mar. 6, 2007, in corresponding PCT App. No. PCT/JP2007/051129 (1 pg.).

* cited by examiner

*Primary Examiner* — Hung Dang
(74) *Attorney, Agent, or Firm* — Staas & Halsey LLP (57) ABSTRACT

Provided is a technology for recording the information of contents recorded in a recording medium, when the reproduction of the contents is instructed by a user, thereby to extract a favorite program of the user on the basis of that information. For the technology, the contents stored in the recording medium in accordance with the operation of the user are reproduced. In case the contents are reproduced, the information indicating the reproduced contents is read out and recorded as reproduction history information. A list of programs to be broadcast is received, and the program according to the reproduction history information is extracted as the favorite program of the user from that list.

12 Claims, 11 Drawing Sheets

| VOLUME SERIAL | VOLUME LABEL | TITLE | VIEWING DATE | VIEWING COUNT | USER NAME | PATH NAME OF STATIC IMAGE |
|---|---|---|---|---|---|---|
| D93733BA | Earth_heri | GLOBAL HERITAGE VOL. 9 CAMBODIA EDITING ERI TANAKA | 2006/12/01 19:15~21:30 | 2 | FATHER | C:¥DVD_Library ¥D...¥01.jpg |
| ---- | ---- | ---- | ---- | ---- | ---- | ---- |

FIG. 7

| TIME | CHANNEL | | |
|---|---|---|---|
| | 1CH<br>JAPAN BROADCASTING | 2CH<br>TOKYO BROADCASTING | 3CH<br>OO BROADCASTING |
| 4 | TITLE: SERIES GLOBAL HERITAGE 100<br>BROADCAST TIME: 16:00–16:55<br>PERFORMERS: TARO YAMADA, ICHIRO SATOH<br>DETAILS: HEADSTREAM OF MODERNISM PAU-HOUSE | TITLE: ........<br>BROADCAST TIME: 16:10–17:00<br>PERFORMERS: ........<br>DETAILS: ........ | TITLE: ....<br>BROADCAST TIME: ....<br>PERFORMERS: ....<br>DETAILS: .... |
| 5 | | TITLE: ASIA TRAVELOGUE<br>BROADCAST TIME: 17:00–18:30<br>PERFORMERS: ERI TANAKA<br>DETAILS: JOURNEY TOUCHING CULTURE OF CAMBODIA | |

71 — circle around 1CH row 4 content
72 — circle around 2CH row 5 content

FAVORITE PROGRAM EXTRACTING DEVICE AND METHOD

CROSS-REFERENCE OF RELATED APPLICATION

This is a continuation of Application PCT/JP2007/051129, filed on Jan. 25, 2007, now pending, the contents of which are herein wholly incorporated by reference.

FIELD

The embodiment discussed herein is related to a technology of extracting a program suited to a user's favorite.

BACKGROUND

Over the recent years, a personal computer has included a variety of functions such as viewing a TV program and reproducing a DVD-Video.

In the case of viewing the TV program, a user (viewer) gets an electronic program guide (EPG) displayed on a display of the computer, then finds out a favorite program from the EPG and views this program, which usage has become commonly accepted. The EPG, which is transmitted as carried on a part of broadcasting waves, can be therefore utilized if in an environment enabling the TV program to be viewed, and is more convenient than preparing a conventional printed program guide separately.

In the EPG, however, if trying to see more of channels and more of time zones, only some proportion of data is displayed on the display of the computer, which entails looking at the data while scrolling, resulting in a poor-browsability-case and a hard-to-find-a-favorite-program case. In particular, the data must be searched in a limited space other than the Window displaying the TV program in the middle of viewing the TV program, which involves extreme difficulty.

Such being the case, a device is proposed, which accumulates the information about the TV programs viewed in the past and extracts the program suited to the user's favorite.

[Patent Document 1]
International Publication WO02/059785
[Patent Document 2]
Japanese Patent Laid-Open Publication No. H11-134345

SUMMARY

If the method of recording the information about the programs viewed in the past is taken for judging the user's favorite, it follows that the information used in the case of zapping for finding out the favorite program of the user is recorded, and it happens that the information is not correctly reflected in the user's favorite.

Further, if there is not any want-to-view program as a result of zapping, the user might select a general category of program such as news and a weather forecast for the time being. The information about such a general category of program does not represent the user's favorite but becomes a noise in terms of judging the user's favorite as described above.

Moreover, if the want-to-view program is not started just when switching on a television, though there is a case of keeping the TV switched on till the want-to-view program is started, the information about the program broadcasted at that time is not related to the user's favorite but becomes the noise in terms of judging the user's favorite in the same way as described above.

Thus, the TV program is broadcasted one-sidedly according to a schedule on the side of the broadcasting station and viewed irrespective of the user's favorite, and it is difficult to judge the user's favorite with high accuracy from the information about the TV program.

Such being the case, it is an object in one aspect of the invention to provide a technology of, when the user gives an instruction of reproducing a content recorded on a recording medium as in the case of reproducing a DVD-Video, recording the information about the content and extracting the favorite program of the user on the basis of the content information.

The present invention adopts the following configuration in order to solve the problems given above.

Namely, a favorite program extracting device according to the present invention includes, a reproducing unit reproducing a content stored on a recording medium in response to a user's operation, an information registering unit reading and recording, when the content is reproduced, information representing the reproduced content as reproduction history information, a list receiving unit receiving a list of programs to be broadcasted and an extracting unit extracting a program associated with the reproduction history information from the list as a user's favorite program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
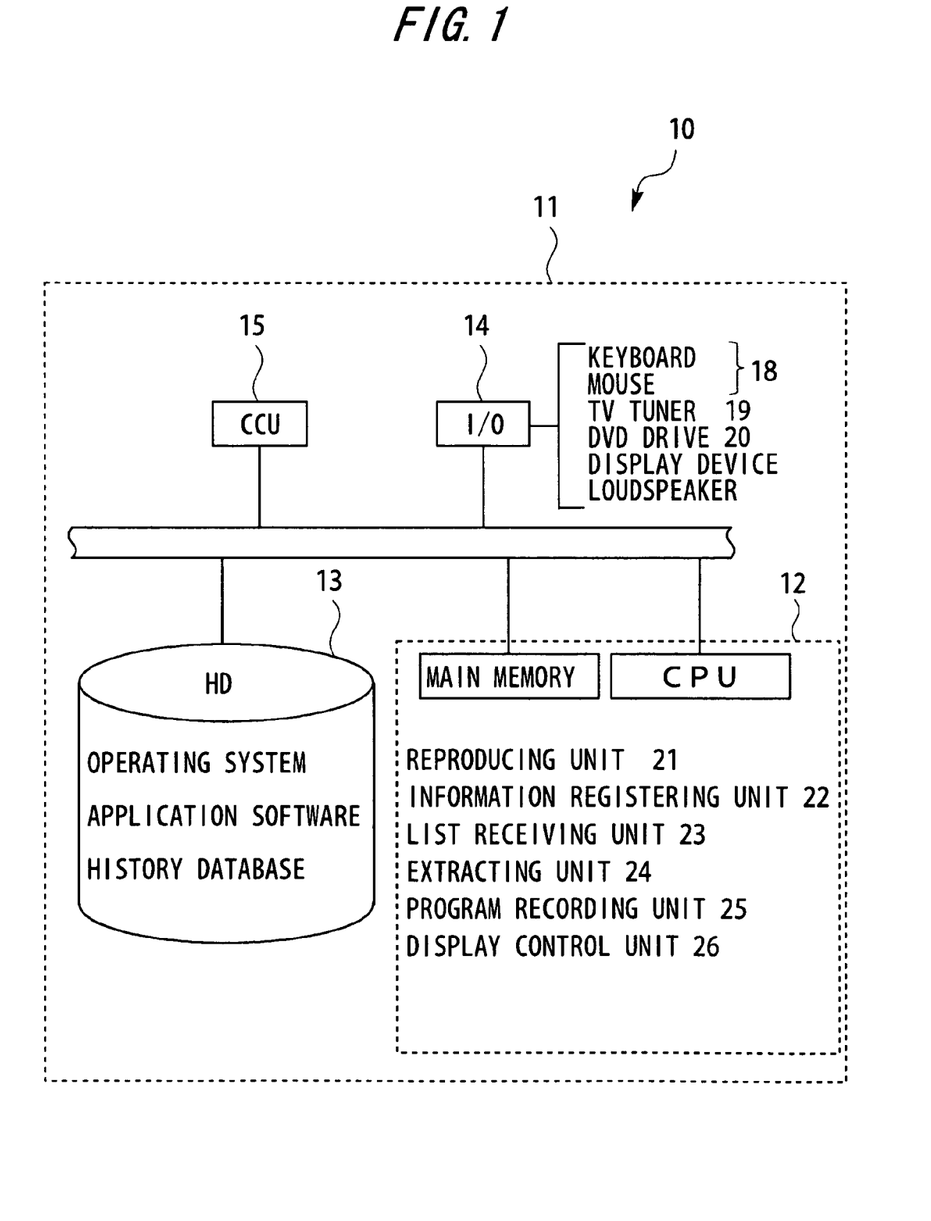
FIG. 1 is a schematic diagram of a favorite program extracting device according to the present invention.
Figure 2:
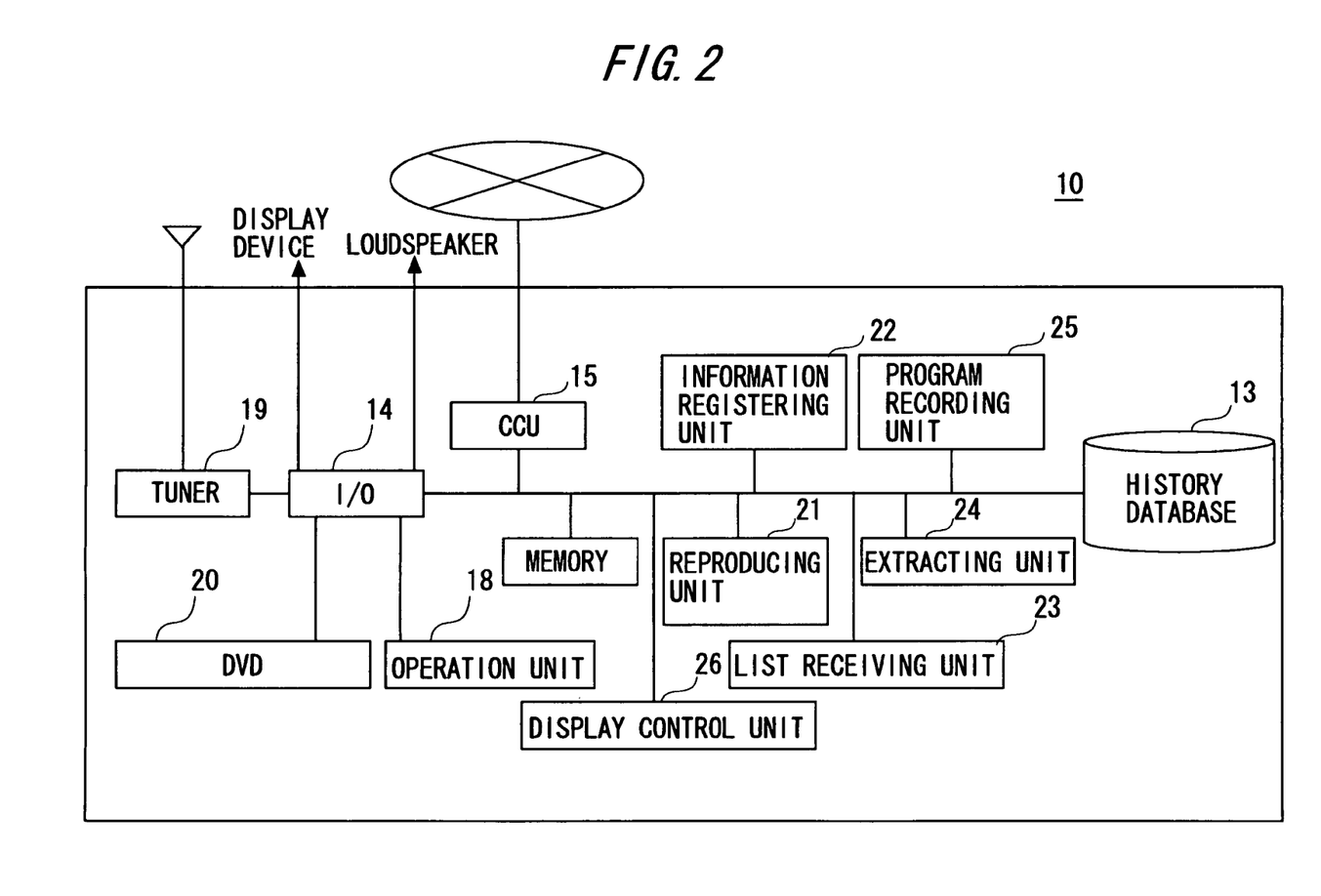
FIG. 2 is a function block diagram of the favorite program extracting device according to the present invention.

FIG. 1 is a schematic diagram of a computer defined as a favorite program extracting device according to the present invention, and FIG. 2 is a function block diagram of respective units configuring the favorite program extracting device.

A favorite program extracting device 10 in the present embodiment is a computer including an arithmetic processing unit 12 constructed of a CPU (Central Processing Unit), a main memory, etc, a storage unit (hard disk) 13 stored with data and software for an arithmetic process, an input/output port 14, a communication control unit (CCU) 15 and so on.

Connected properly to the I/O port 14 are input devices such as an operation unit (keyboard, mouse, etc) 18, a DVD drive 20 and a TV tuner (corresponding to a program receiving unit) 19, and output devices such as a display device and a printer.

The TV tuner 19 receives radio waves, i.e., a broadcasted program from a broadcasting station, and inputs image signals and voice signals (which will hereinafter be also simply termed video information) and an EPG (Electronic Program Guide) to an arithmetic processing unit 12.

The CCU 15 performs communications with other computers via a network.

The storage unit 13 is preinstalled with an operating system (OS) and application software (a favorite program extracting program). Further, a history database registered with reproduction history information is configured (stored) in the storage unit 13 in the present embodiment.

The arithmetic processing unit 12 properly reads the OS and the application software from the storage unit 13, then executes the OS and the application software, and carries out the arithmetic process of the information inputted from the I/O port 14 and from the CCU 15 and the information read from the storage unit 13, thereby functioning also as a reproducing unit 21, an information registering unit 22, a list receiving unit 23, an extracting unit 24, a program recording unit 25 and a display control unit 26.

The reproducing unit 21 reproduces a content stored on a recording medium in response to a user's operation. To be specific, the reproducing unit 21 reads the video information from the content recorded on the recording medium such as a CD and a DVD set in the DVD drive (reading device) 20 by the user, then decodes the readout video information, displays a picture on the display device, and outputs the sound (voice) from a loudspeaker. Note that the user is enabled to select the recording medium (content) to be set without any restrictions, and is operable to arbitrarily start or stop reproducing the content.

The information registering unit 22, when detecting the operation of the reproducing unit 21 and detecting that the content is reproduced, reads the information specifying the reproduced content, and registers (records) the information as reproduction history information in the history database.

The list receiving unit 23 receives the EPG broadcasted together with the program as carried on the radio waves from the broadcasting station via the TV tuner 19.

The extracting unit 24 obtains a user's favorite from the reproduction history information as will be explained later on, and extracts a program, as a user's favorite program, suited to the user's favorite from the EPG.

The display control unit 26 displays the information specifying the favorite program during the display of the received program. At this time, the display control unit 26 may display options for recording or displaying the favorite program together with the information specifying the favorite program.

The program recording unit 25, when the user selects the option, records the program.

Thus, the application software (the favorite program extracting program) executed by the favorite program extracting device 10 according to the present embodiment is a so-called integrated application including a CD/DVD reproducing function and TV program viewing/recording function. Then, the favorite program extracting device 10 extracts, based on information such as titles etc of the CD, DVD and VCD reproduced by the reproducing unit 21, the favorite program suited to the user's favorite from within the TV programs displayed by the display control unit 26.

A favorite program extracting method executed by the favorite program extracting device 10 in the present embodiment by executing the integrated application, will hereinafter be described with reference to FIGS. 3 through 13.

Figure 3:
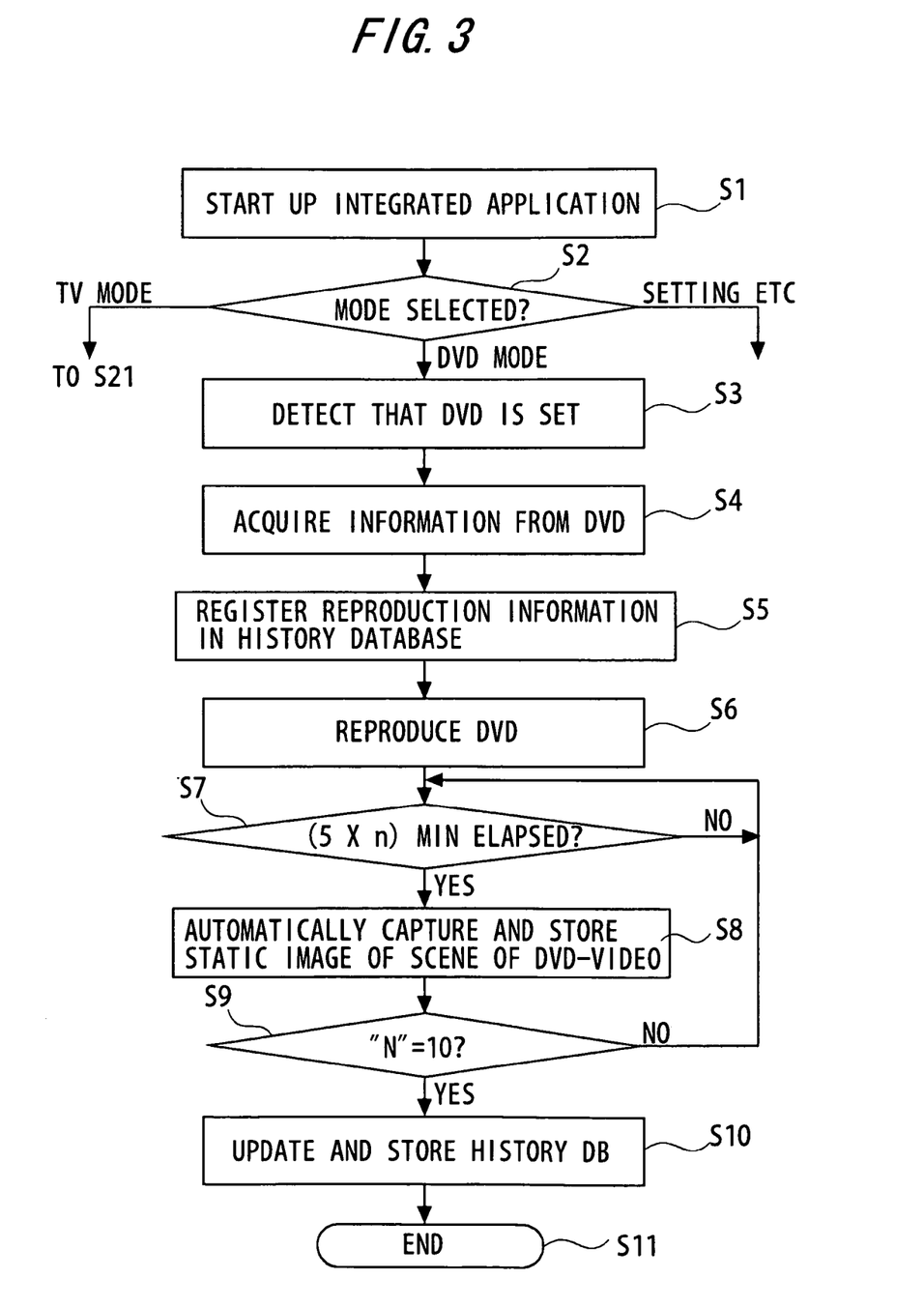
FIG. 3 is an explanatory diagram of a process of registering reproduction history information from a reproduced recording medium.

FIG. 3 is an explanatory diagram on the occasion of registering the reproduction history information from the reproduced recording medium.

Figure 4:
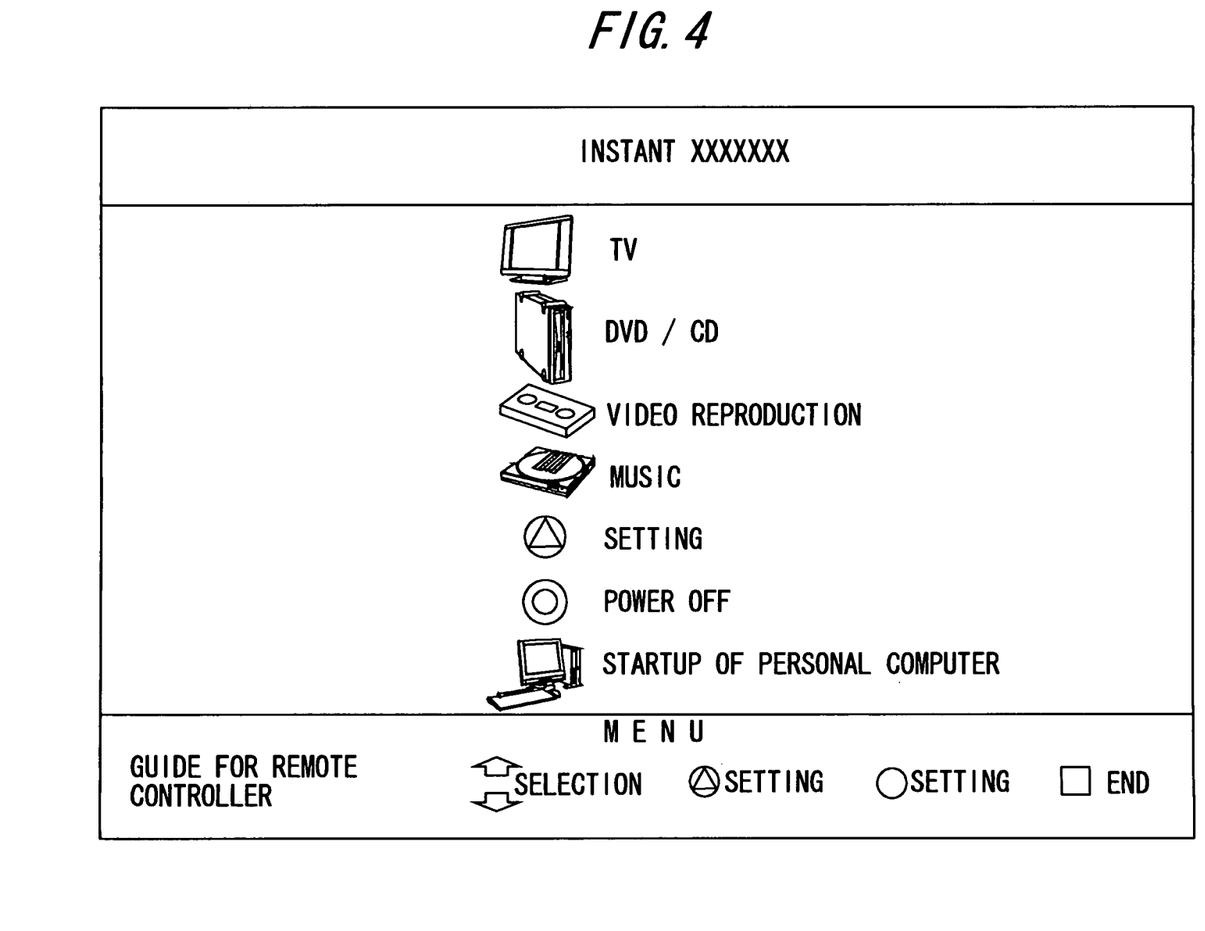
FIG. 4 is a diagram illustrating one example of a top menu.

To begin with, when a startup of the integrated application is instructed by the user's operation, the arithmetic processing unit 12 reads the integrated application from the recording device 13 and executes the integrated application (step 1, which will hereinafter be abbreviated such as S1). FIG. 4 illustrates a top menu displayed on the display device by the display control unit 26 when starting up the integrated application.

The user selects a desired mode from this menu. Specifically, the arithmetic processing unit 12, when deciding that the user selects the DVD mode (S2), executes processes from step 3 onward.

Herein, the information registering unit 22, in the case of detecting that the user sets the DVD in the DVD drive 20 (S3), reads items of information such as a title, a volume label and a volume serial of the DVD from this DVD (S4), and registers the readout information as the reproduction history information in the history database of the storage unit 13 (S5).

Then, the reproducing unit 21 reproduces the content recorded on the DVD (S6).

Further, the information registering unit 22 captures the images reproduced by the reproducing unit 21 at an interval of a predetermined period of time, and adds the images to the reproduction history information. In the embodiment, the information registering unit 22 determines whether or not (5×n) min has elapsed since the start of the reproduction (S7), then captures the image reproduced at every elapse of this period of time, and adds the captured image as a static image (thumbnail image) to the reproduction history information (S8).

At this time, the information registering unit 22, till n comes to 10, repeats (S9) the capturing (S7, S8), then stores the information in the history database when n reaches 10, and terminates the reproduction history information registering process (S10). The information registering unit 22 may acquire and add, in addition to the information acquired from the DVD, a viewing date (a date and time when lastly reproduced), a viewing count (an integration count of how many the DVD is reproduced) and a user name (a name of the user of the OS when reproduced) to the reproduction history information.

Figure 5:
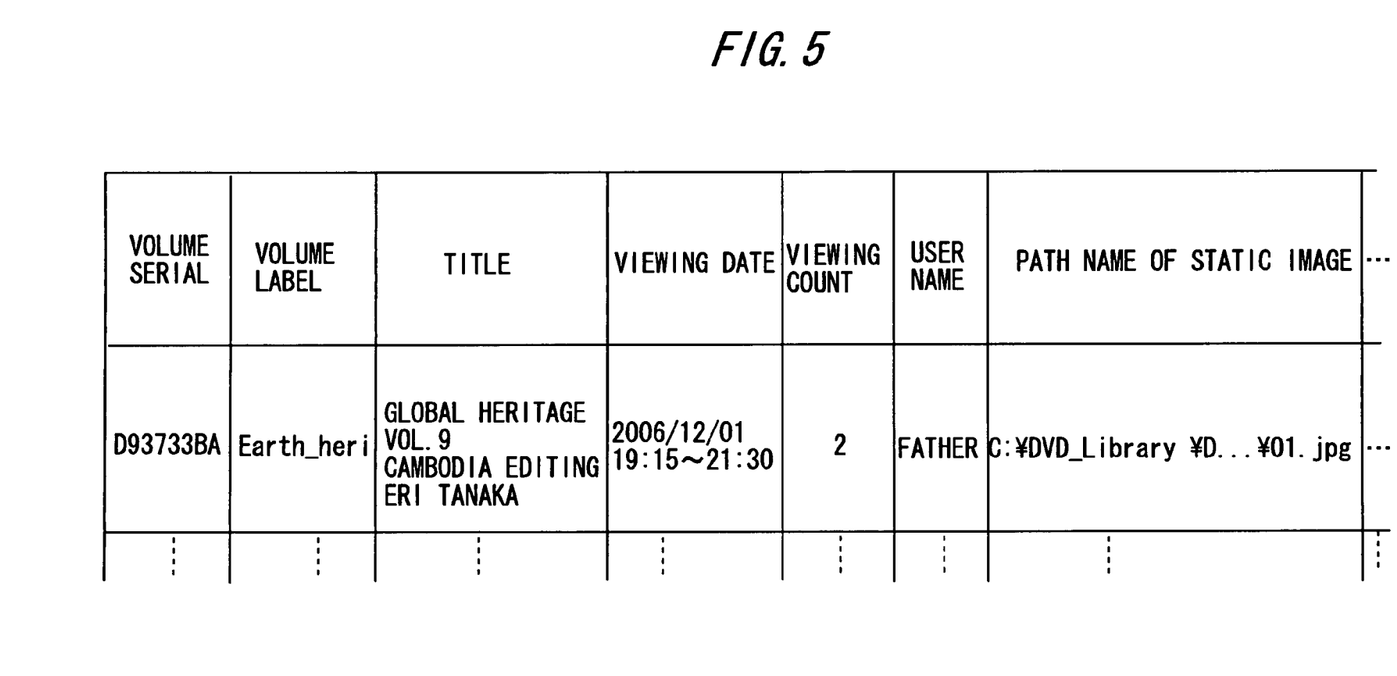
FIG. 5 is an explanatory diagram of a history database.

FIG. 5 is an explanatory diagram of the history database registered with the reproduction history information. The history database is stored with the title, the viewing date, the viewing count, the user name, a path name of the static image in the way of being associated with the volume serial or the volume label of each DVD.

Note that the information registering unit 22 may acquire the information associated with the volume serial or the volume label of the DVD from another computer via the network such as the Internet, and may use the information as the reproduction history information. The information may be acquired by searching through a database on a specified site and may also be acquired by searching through and a database on an unspecified site via a search engine etc.

Then, when completing the reproduction of the content and when the user selects a stop button, the arithmetic processing unit 12 terminates the DVD mode (S11).

Figure 6:
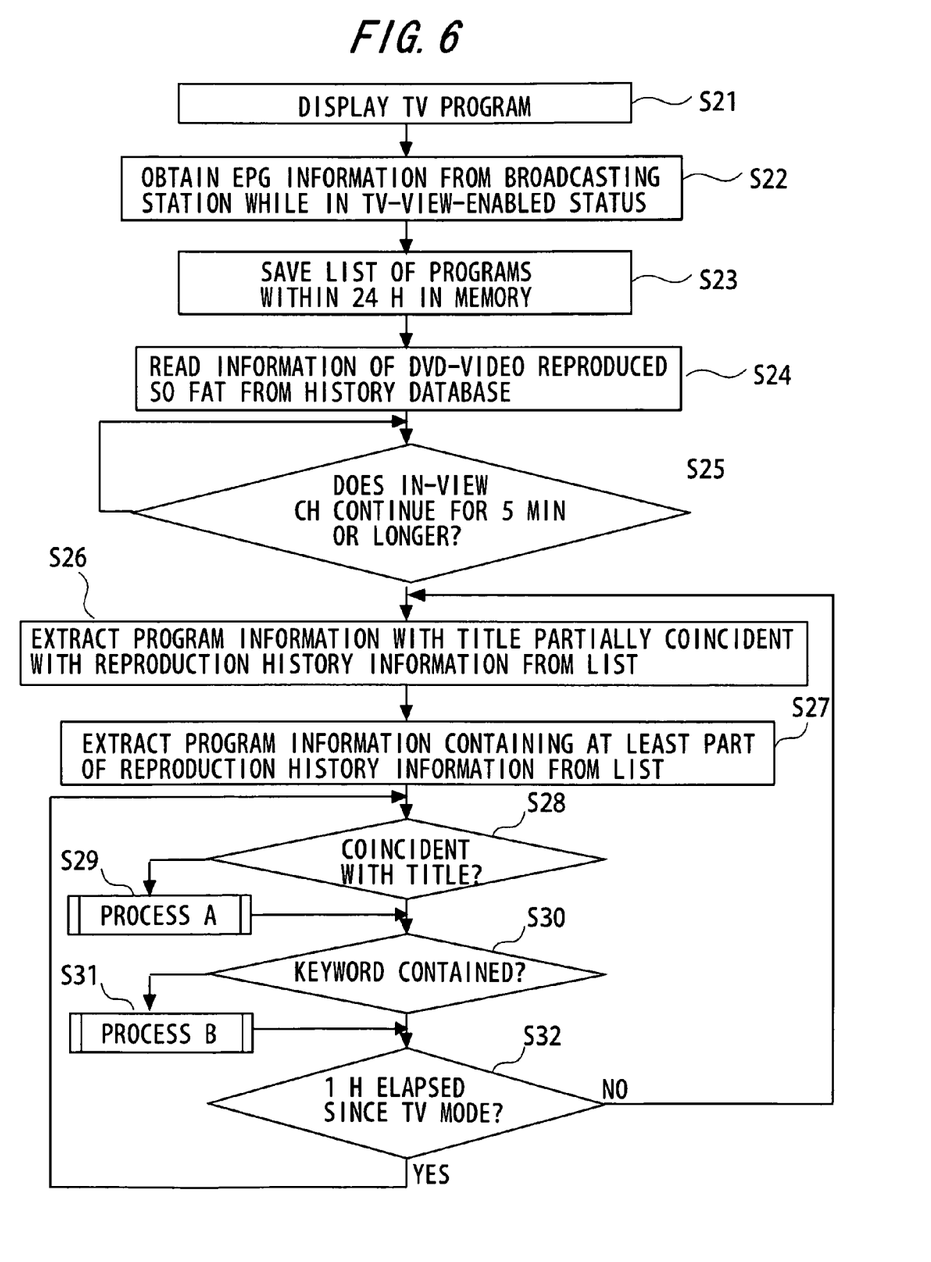
FIG. 6 is an explanatory diagram of a process of extracting and displaying information about a favorite program.

Next, a process of extracting and displaying the favorite program information when watching the TV will hereinafter be described with reference to FIG. 6.

The arithmetic processing unit 12, upon detecting that the user selects the TV mode from the top menu, executes the processes from step 21 onward.

To start with, the display control unit 26 displays the TV program received by the TV tuner 19 on the display device (S21).

Figure 7:
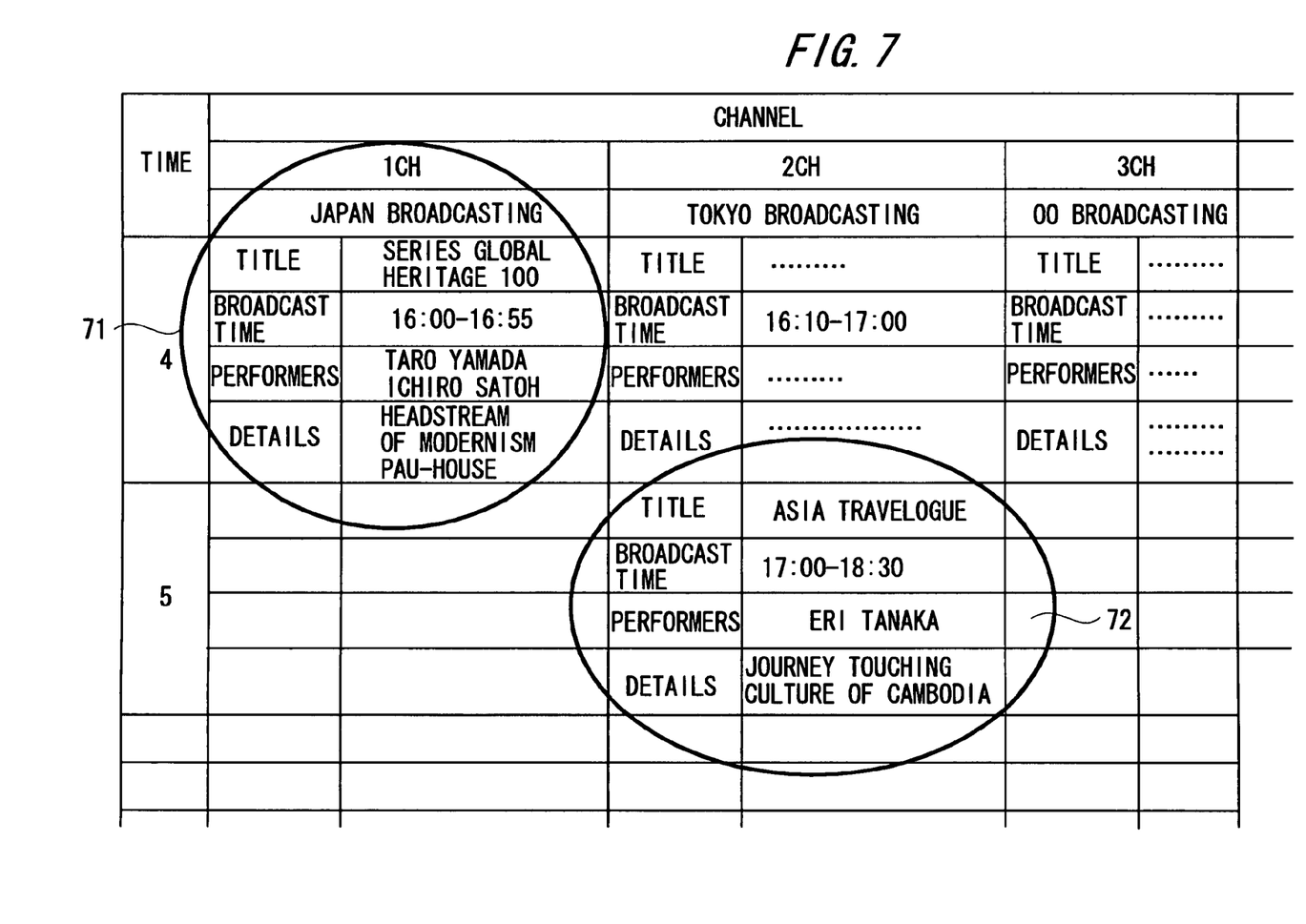
FIG. 7 is a diagram illustrating one example of a program list.

Further, the list receiving unit 23 receives the EPG through the TV tuner 19 (S22) and retains, on a memory, a list within a predetermined period of time, i.e., the list within the period ranging from the present time to 24 hours later (S23). FIG. 7 illustrates one example of this list which contains items of information (a title, broadcasting time, performers, a caption, etc) of the program that is broadcasted at each channel.

The extracting unit 24 reads the reproduction history information from the history database onto the memory (S24).

The arithmetic processing unit 12 stands by till the display time of the present channel reaches a predetermined period of time (e.g., 5 min), then, when reaching the predetermined time, determines not that zapping is carried out but that the user views, and executes the extracting process from step 26 onward (S25).

The extracting unit 24 extracts a program with its title coincident with at least a part of the reproduction history information as the favorite program suited to the user's favorite from the list on the memory (S26).

Furthermore, the extracting unit 24 extracts a program with its program information containing at least a part of the reproduction history information as the favorite program suited to the user's favorite from the list on the memory (S27).

As illustrated in FIG. 5, if the title of the reproduction history information is "Global Heritage Vol. 9 Cambodia Editing/Eri Tanaka", keywords are generated by segmenting the title into predetermined units such as words and phrases. At this time, with respect to the keywords, unnecessary word, phrase and mark are preset and may be deleted. For example, "Vol. 9", "Editing" and "/" are deleted, while "Global Heritage", "Cambodia" and "Eri Tanaka" are set as the keywords.

Then, in step 26, the program information with its title partially coincident with the keywords is searched. In the example of FIG. 7, information 71 is extracted.

Further, in step 27, the program information containing the keywords is extracted. In the example of FIG. 7, information 72 is extracted.

At this time, if there are plural pieces of coincident program information, a favorite level is obtained in a way that refers to predetermined conditions such as a multiplicity of coincident keywords and a length of keyword, and one or a predetermined number of keywords exhibiting the high favorite level may be extracted. On the occasion of obtaining the favorite level, the viewing date and the viewing count are employed, and information about how much later the viewing date is and how much larger the viewing count is, may be set as conditions. Moreover, the extracting unit 24 may specify the user who views the TV from the acquisition of the user name of the OS, an input of a code by the user and reading biometric information of the user, and may extract the favorite program from the reproduction history information stored in the way of being associated with the user name.

Figure 8:
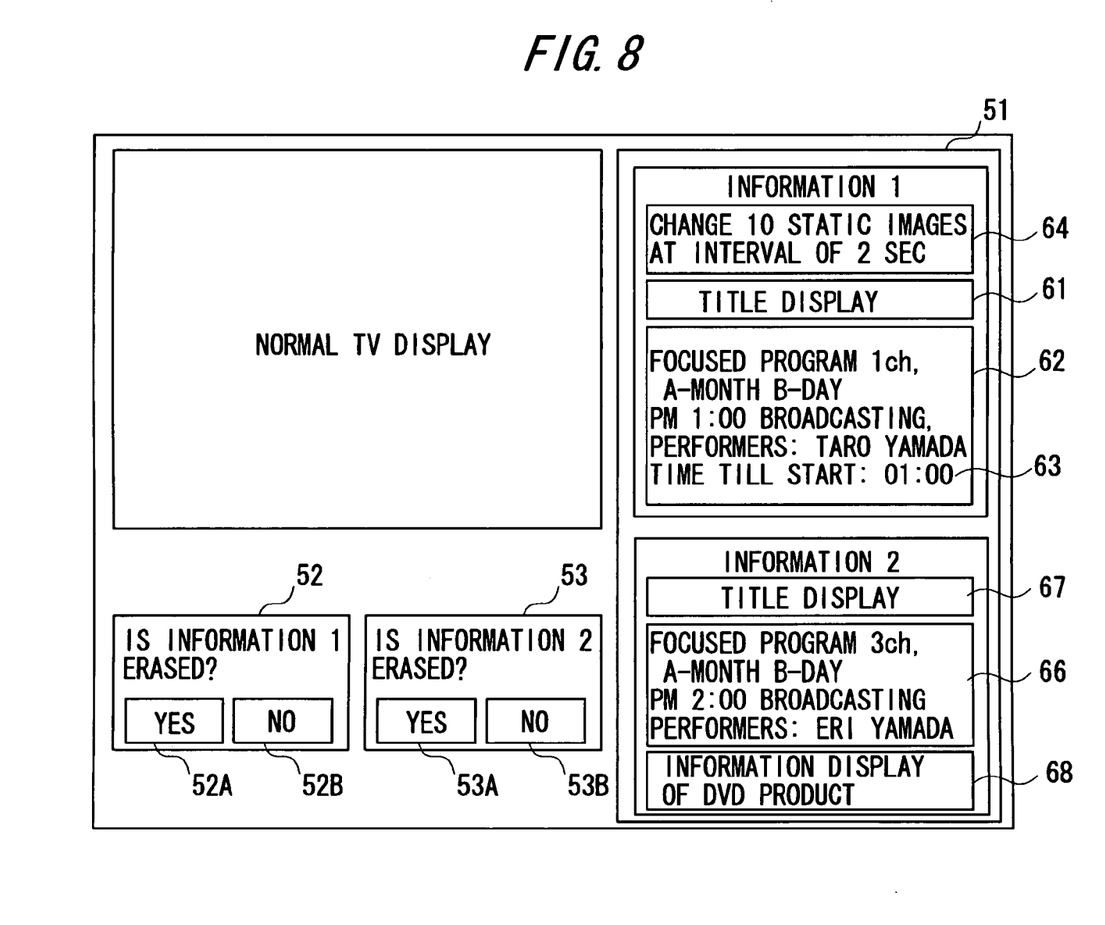
FIG. 8 is a diagram illustrating a display example of the favorite program.

In step 26, if there is the coincident title, the display control unit 26 displays, as depicted in FIG. 8, the extracted information 1 in an information display box 51 (S28, S29). Similarly, in step 27, if there is the program information containing the keywords, the display control unit 26 displays, as depicted in FIG. 8, the extracted information 2 in the information display box 51 (S30, S31).

Then, the arithmetic processing unit 12 loops back to step 28 and repeats the display till the user selects the termination of the TV mode, or alternatively loops back to step 26 at an interval of one hour and repeats the extracting process and the display process (S32).

Figure 9:
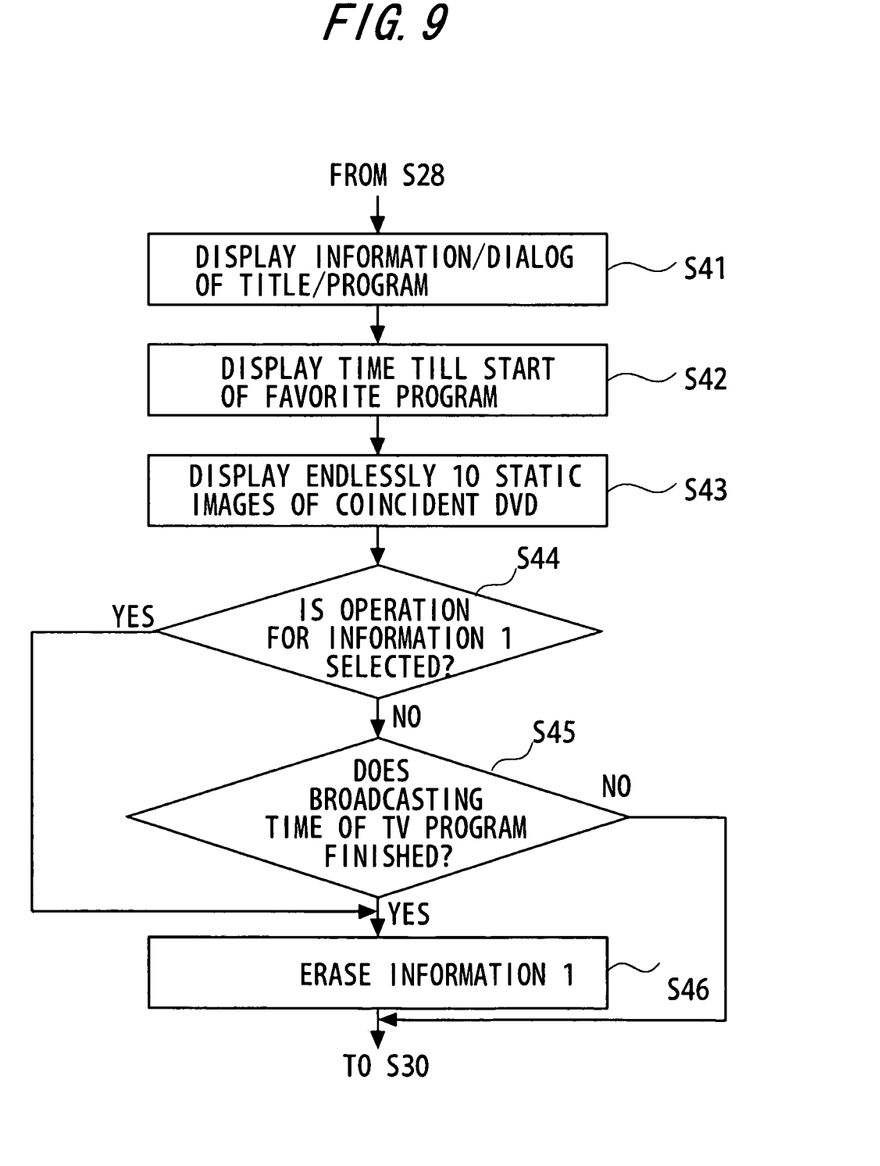
FIG. 9 is an explanatory diagram of a process of displaying the information about the favorite program.

FIG. 9 illustrates a process of displaying the information 1 in step 29. Herein, the display control unit 26 displays a title 61 of the coincident DVD, information 62 about the extracted program and a dialog (option) 52 for getting the operation selected with respect to the information 1 (S41).

Further, the display control unit 26 obtains time 63 till the program is started in a way that compares the present time with the broadcasting time, then displays the time 63 (S42), and displays a static image 64 of the DVD (S43). The static image 64 is endlessly displayed in a way that sequentially changes 10 images registered in the history database at an interval of 2 sec.

Then, the display control unit 26, when detecting that erase of the information is selected, i.e., when determining that a button 52A of the dialog 52 is selected (clicked), the information 1 and the dialog 52 are erased (S44, S46).

Moreover, the display control unit 26, when deciding from comparing the present time with the broadcasting time that the broadcasting of the program is finished, erases the information 1 and the dialog 52 (S45, S46).

While on the other hand, if the erase is not selected in step 44 and when deciding in step 45 that the broadcasting time does not come to an end, the display control unit 26 repeats the processes described above till the TV mode is terminated (S32).

Figure 10:
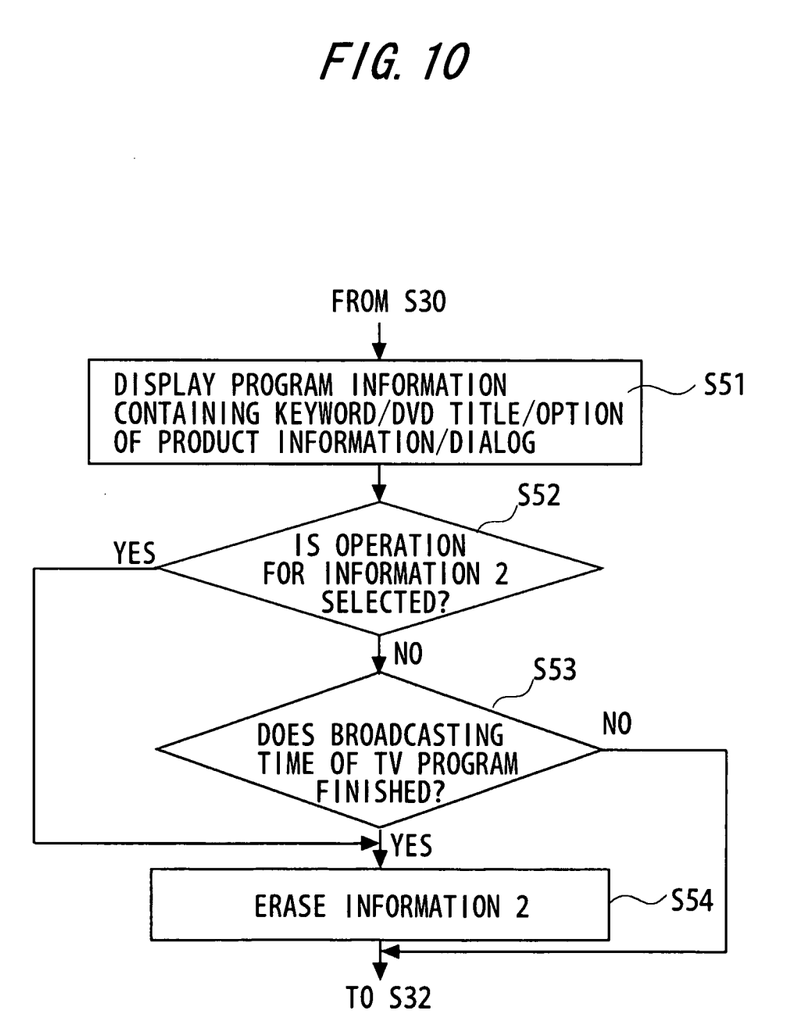
FIG. 10 is an explanatory diagram of the process of displaying the information about the favorite program.

Further, FIG. 10 depicts a process of displaying the information 2 in step 31. Herein, the display control unit 26 displays program information 66 extracted in step 27, a DVD title 67 used for the extraction, an option 68 for displaying detailed information about the DVD (the recording medium), and the dialog (option) 52 for getting the operation selected with respect to the information 2 (S51).

Figure 11:
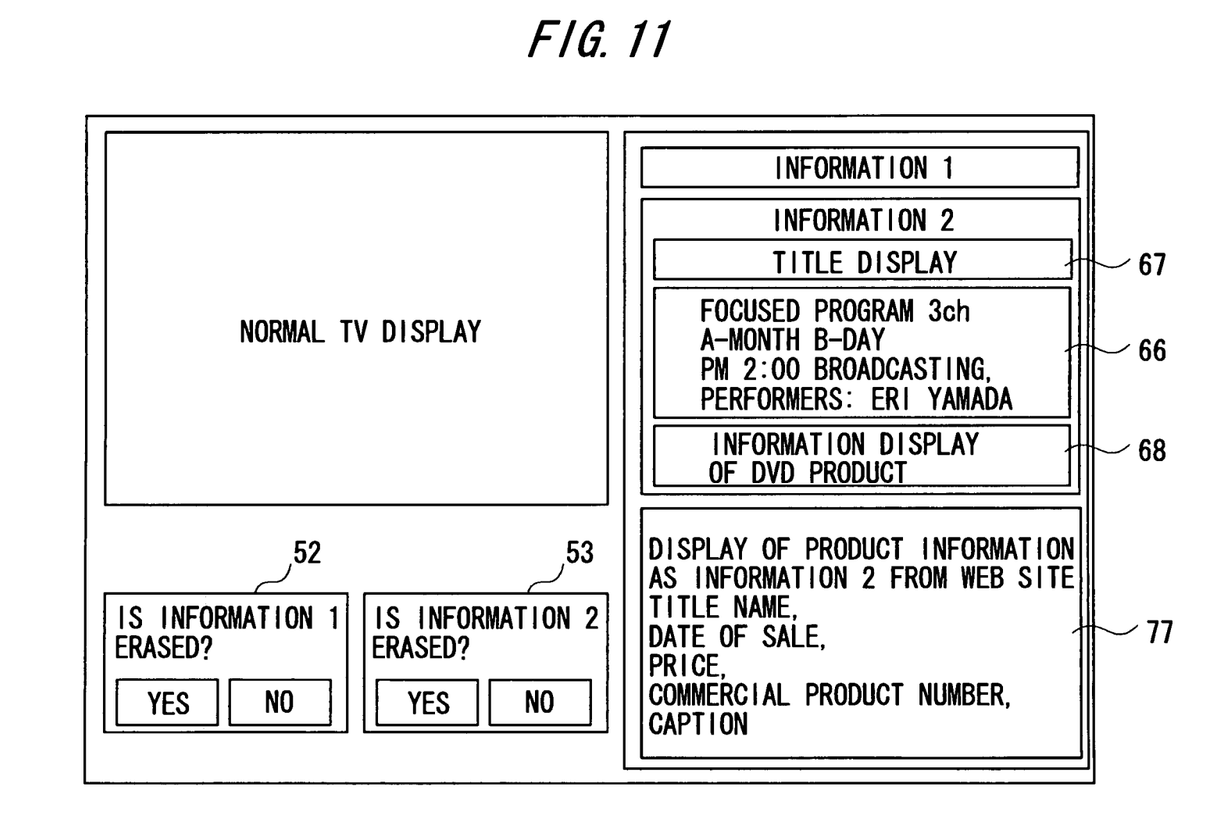
FIG. 11 is a diagram illustrating a display example of detailed information.

Note that if the option 68 is selected, the detailed information associated with the volume label of the DVD is searched from within the server connected via the network such as the Internet and then displayed. In the present embodiment, as illustrated in FIG. 11, there is displayed product information 73 of the DVD such as a title, a date of sale, a price, a commercial product number and a caption. The product information (detailed information) 73 may be searched and displayed for every display of the information 2, and may also be searched and registered beforehand in the history database when registering the reproduction history information, then read from the database and thus displayed.

Then, the display control unit 26, when detecting the ease of the information 2 is selected, i.e., when determining that a button 53A of a dialog 53 is selected (clicked), erases the information 2 and the dialog 53 (S52, S54).

Furthermore, the display control unit 26, when determining from comparing the present time with the broadcasting time that the broadcasting of the program is finished, erases the information 2 and the dialog 53 (S53, S54).

While on the other hand, if the erase is not selected in step 52 and when deciding in step 53 that the broadcasting time does not come to an end, the display control unit 26 repeats the processes described above till the TV mode is terminated (S32).

Note that if options 52B, 53B representing that neither the information 1, 2 nor the information is erased are selected in the dialogs 52, 53, the dialogs 52, 53 may not be displayed in steps 41, 51.

Thus, according to the present embodiment, the favorite program is extracted and displayed based on the information about the reproduced content on the recording medium such as the DVD and the CD, and hence the information about the program suited to the user's favorite can be displayed with high accuracy.

Namely, the reproduction is started and stopped based on the reproduction history information of the content that can be arbitrarily operated by the user, and therefore the information on the viewed program is not contained as a noise on the contrary to the intention of the user as hitherto done, thereby enabling the user's favorite to be acquired with the high accuracy.

The favorite program extracting device in the first embodiment discussed above realizes softwarewise the functions of the respective units, however, the respective units of the favorite program extracting device 10 according to the present invention may, without being limited to this configuration, be electronic appliances such as a DVD recorder that is hardwarewise constructed of electronic circuits etc.

The discussion made so far has exemplified the DVD as the recording medium, however, the recording mediums such as the CD, VCD and the memory may also be used if readable by the favorite program extracting device 10. Note that if the recording medium does not contain the image as in the case of a music CD, the image capturing process is omitted. Further, in place of the image capturing process, images of a jacket and a package corresponding to the volume label may also be acquired from other computers via the network.

Moreover, in the embodiment discussed above, the erase option is displayed as the operation about the information 1 and the information 2, however, without being limited to this type of option, options such as reservation for recording, the reservation for viewing, etc may also be displayed.

For instance, if the recording reservation is selected, the program recording unit 25 registers, based on the program information of the information 1 and the information 2, the broadcasting time and the channel as recording reservation information in the storage unit 13 and in a timer (which is unillustrated and a task function etc of the OS). Then, the arithmetic processing unit 12, when receiving from the timer a piece of notification saying that the broadcasting start time is reached, starts up the integrated application in the TV mode, and the program recording unit 25 stores the program received via the TV tuner 19 in the storage unit 13.

Further, when the viewing reservation is selected, the arithmetic processing unit 12 registers, based on the program information of the information 1 and the information 2, the broadcasting time and the channel as the reservation information in the storage unit 13 and in the timer. Then, the arithmetic processing unit 12, when receiving from the timer the notification saying that the broadcasting start time is reached, starts up the integrated application in the TV mode, and the display control unit 26 displays the program received via the TV tuner 19 on the display device.

<Others>

Herein, the recording medium readable by the computer connotes a recording medium capable of storing information such as data and programs electrically, magnetically, optically, mechanically or by chemical action, which can be read from the computer. Among these recording mediums, for example, a flexible disc, a magneto-optic disc, a CD-ROM, a CD-R/W, a DVD, a DAT, an 8 mm tape, a memory card, etc are given as those demountable from the computer.

Further, a hard disc, a ROM (Read-Only Memory), etc. are given as the recording mediums fixed within the computer.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A favorite program extracting device, comprising:
   a reproducing unit configured to reproduce a content stored on a recording medium in response to a user's operation;
   an information registering unit configured to read and record, when the content is reproduced, information representing the reproduced content and an image captured when a predetermined period has elapsed since the start of the reproduction as reproduction history information;
   a list receiving unit configured to receive a list of programs to be broadcasted;
   an extracting unit configured to extract a program associated with the reproduction history information from the list as a user's favorite program;
   a program receiving unit configured to receive the program; and
   a display control unit configured to display both the received program and information, including the image captured when the predetermined period has elapsed since the start of the reproduction, to represent the favorite program together.

2. A favorite program extracting device according to claim 1, wherein said reproducing unit enables, based on the user's operation, a user to start or stop reproducing the content arbitrarily.

3. A favorite program extracting device according to claim 1, wherein said display control unit gets an option for recording the program displayed together with the information to represent the favorite program, and includes a program recording unit configured to record the program when the option is selected.

4. A favorite program extracting device according to claim 1, wherein said information registering unit reads detailed information associated with the information representing the reproduced content from a database, and records the readout information as reproduction history information.

5. A favorite program extracting method by which a favorite program extracting device executes:
   reproducing a content stored on a recording medium in response to a user's operation;
   reading and recording, when the content is reproduced, information representing the reproduced content and an image captured when a predetermined period has elapsed since the start of the reproduction as reproduction history information;
   receiving a list of programs to be broadcasted;
   extracting a program associated with the reproduction history information from the list as a user's favorite program;
   receiving the program; and displaying both the received program and information, including the image captured when the predetermined period has elapsed since the start of the reproduction, to represent the favorite program together.

6. A favorite program extracting method according to claim 5, wherein said content reproducing includes enabling, based on the user's operation, a user to start or stop reproducing the content arbitrarily.

7. A favorite program extracting method according to claim 5, wherein said favorite program extracting device executes, when an option for recording, on the occasion of displaying the information to represent the favorite program, the program together with the information is displayed, recording the program when the option is selected.

8. A favorite program extracting method according to claim 5, wherein said favorite program extracting device executes reading detailed information associated with the information representing the reproduced content from a database.

9. A computer-readable non-transitory storage medium stored with a favorite program extracting computer program making a computer execute:
reproducing a content stored on a recording medium in response to a user's operation;
reading and recording, when the content is reproduced, information representing the reproduced content and an image captured when a predetermined period has elapsed since the start of the reproduction as reproduction history information;
receiving a list of programs to be broadcasted;
extracting a program associated with the reproduction history information from the list as a user's favorite program;
receiving the program; and
displaying both the received program and information, including the image captured when the predetermined period has elapsed since the start of the reproduction, to represent the favorite program together.

10. The computer-readable non-transitory storage medium according to claim 9, wherein said content reproducing includes enabling, based on the user's operation, a user to start or stop reproducing the content arbitrarily.

11. The computer-readable non-transitory storage medium according to claim 9, wherein said computer is made to execute, when an option for recording, on the occasion of displaying the information to represent the favorite program, the program together with the information is displayed, recording the program when the option is selected.

12. The computer-readable non-transitory storage medium according to claim 9, wherein said computer is made to execute reading detailed information associated with the information representing the reproduced content from a database.

* * * * *